(12) United States Patent
O'Brien

(10) Patent No.: US 7,316,794 B2
(45) Date of Patent: Jan. 8, 2008

(54) CONTINUOUS PRODUCTION OF CATALYST COATED MEMBRANES

(75) Inventor: William George O'Brien, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 399 days.

(21) Appl. No.: 10/490,068

(22) PCT Filed: Oct. 24, 2002

(86) PCT No.: PCT/US02/34103

§ 371 (c)(1),
(2), (4) Date: Mar. 16, 2004

(87) PCT Pub. No.: WO03/036748

PCT Pub. Date: May 1, 2003

(65) Prior Publication Data

US 2004/0201122 A1    Oct. 14, 2004

(51) Int. Cl.
C04B 35/00 (2006.01)
B29C 59/00 (2006.01)
B29C 41/24 (2006.01)
H01M 4/88 (2006.01)
H01M 8/10 (2006.01)
H01M 4/00 (2006.01)

(52) U.S. Cl. ............ 264/104; 264/129; 264/166; 502/4; 502/101; 429/30; 429/40; 427/115

(58) Field of Classification Search ............ 429/12–46; 427/115, 258, 261, 265; 156/230; 29/623.1; 252/514; 264/166, 129, 330.14, 173.11, 264/172.19, 204; 502/4, 101
See application file for complete search history.

(56) References Cited

U.S. PATENT DOCUMENTS

| 5,336,570 | A   |   | 8/1994  | Dodge, Jr. |
|-----------|-----|---|---------|------------|
| 5,415,888 | A   | * | 5/1995  | Banerjee et al. ............ 427/125 |
| 5,693,434 | A   |   | 12/1997 | Li et al. |
| 5,700,300 | A   | * | 12/1997 | Jensen et al. .............. 29/623.5 |
| 5,945,231 | A   |   | 8/1999  | Narayanan et al. |
| 6,010,771 | A   | * | 1/2000  | Isen et al. ................... 428/209 |
| 6,074,692 | A   | * | 6/2000  | Hulett ........................ 427/115 |
| 6,395,043 | B1  | * | 5/2002  | Shadle et al. .............. 29/623.4 |
| 6,403,245 | B1  | * | 6/2002  | Hunt ........................... 429/33 |
| 6,500,217 | B1  | * | 12/2002 | Starz et al. ................ 29/623.5 |
| 6,641,862 | B1  | * | 11/2003 | Grot ........................... 427/115 |
| 6,649,295 | B2  | * | 11/2003 | Hamrock et al. ........... 429/30 |
| 6,753,108 | B1  | * | 6/2004  | Hampden-Smith et al. ... 429/44 |

(Continued)

FOREIGN PATENT DOCUMENTS

CA    2300226    3/1999

(Continued)

OTHER PUBLICATIONS

Grot, Walther, "NAFION" as a Separator in Electrolytic Cells, May 7, 1986, Du Pont publication.*

(Continued)

*Primary Examiner*—Christina Johnson
*Assistant Examiner*—Jeff Wollschlager (57) ABSTRACT

A process for the production of catalyst coated membranes, especially catalyst coated membranes for use in fuel cells, that includes applying followed by drying of an electrocatalyst coating composition, a polymeric dispersion and a second electrocatalyst coating composition onto the surface of a temporary substrate, followed by separation of the temporary substrate.

20 Claims, 2 Drawing Sheets

U.S. PATENT DOCUMENTS

| | | | |
|---|---|---|---|
| 6,855,178 B2 * | 2/2005 | Uchida et al. | 29/623.5 |
| 6,967,038 B2 * | 11/2005 | O'Brien | 427/115 |
| 6,977,234 B2 * | 12/2005 | Kosako et al. | 502/101 |
| 6,998,149 B2 * | 2/2006 | Kohler et al. | 427/115 |
| 2002/0136940 A1 * | 9/2002 | Mao et al. | 429/30 |
| 2002/0144394 A1 * | 10/2002 | Uchida et al. | 29/623.5 |
| 2003/0022054 A1 * | 1/2003 | Marsacq et al. | 429/40 |
| 2003/0054218 A1 * | 3/2003 | Hampden-Smith et al. | 429/27 |
| 2003/0148159 A1 * | 8/2003 | Cox et al. | 429/30 |
| 2003/0198849 A1 * | 10/2003 | Hampden-Smith et al. | 429/30 |
| 2003/0219645 A1 * | 11/2003 | Reichert et al. | 429/42 |
| 2004/0053100 A1 * | 3/2004 | Stanley et al. | 429/30 |
| 2004/0086632 A1 * | 5/2004 | Vlajnic et al. | 427/115 |
| 2004/0241519 A1 * | 12/2004 | Howard | 429/33 |
| 2005/0067345 A1 * | 3/2005 | Prugh et al. | 210/500.27 |
| 2005/0118493 A1 * | 6/2005 | Datz et al. | 429/42 |

FOREIGN PATENT DOCUMENTS

| | | |
|---|---|---|
| DE | 197 05 469 | 10/1998 |
| EP | 0344 089 | 11/1989 |
| FR | 2 805 927 | 9/2001 |
| WO | WO 97/23916 | 7/1997 |
| WO | WO 00/72391 | 11/2000 |
| WO | WO 01/80336 | 10/2001 |
| WO | WO 02/058178 | 7/2002 |

OTHER PUBLICATIONS

PCT/US02/34103 International Search Report, dated Oct. 17, 2003.
Kaneko et al., Manufacture of Electrode/ion exchanger and electrode/ion exchanger/electrode laminates, and Patents Abstracts of Japan, vol. 1995, No. 10, Nov. 30, 1995, and JP 07176317 A, Jul. 14, 1995 abstract.

* cited by examiner

CONTINUOUS PRODUCTION OF CATALYST COATED MEMBRANES

FIELD OF THE INVENTION

This invention relates to a continuous method for the production of catalyst coated membranes for use in electrochemical cells, especially catalyst coated membranes for use in fuel cells.

BACKGROUND OF THE INVENTION

A variety of electrochemical cells falls within a category of cells often referred to as solid polymer electrolyte ("SPE") cells. An SPE cell typically employs a membrane of a cation exchange polymer that serves as a physical separator between the anode and cathode while also serving as an electrolyte. SPE cells can be operated as electrolytic cells for the production of electrochemical products or they may be operated as fuel cells.

Fuel cells are electrochemical cells that convert reactants, namely fuel and oxidant fluid streams, to generate electric power and reaction products. A broad range of reactants can be used in fuel cells and such reactants may be delivered in gaseous or liquid streams. For example, the fuel stream may be substantially pure hydrogen gas, a gaseous hydrogen-containing reformate stream, or an aqueous alcohol, for example methanol in a direct methanol fuel cell (DMFC). The oxidant may, for example, be substantially pure oxygen or a dilute oxygen stream such as air.

In SPE fuel cells, the solid polymer electrolyte membrane is typically perfluorinated sulfonic acid polymer membrane in acid form. Such fuel cells are often referred to as proton exchange membrane ("PEM") fuel cells. The membrane is disposed between and in contact with the anode and the cathode. Electrocatalysts in the anode and the cathode typically induce the desired electrochemical reactions and may be, for example, a metal black, an alloy or a metal catalyst supported on a substrate, e.g., platinum on carbon. SPE fuel cells typically also comprise a porous, electrically conductive sheet material that is in electrical contact with each of the electrodes, and permit diffusion of the reactants to the electrodes. In fuel cells that employ gaseous reactants, this porous, conductive sheet material is sometimes referred to as a gas diffusion layer and is suitably provided by a carbon fiber paper or carbon cloth. An assembly including the membrane, anode and cathode, and gas diffusion layers for each electrode, is sometimes referred to as a membrane electrode assembly ("MEA"). Bipolar plates, made of a conductive material and providing flow fields for the reactants, are placed between a number of adjacent MEAs. A number of MEAs and bipolar plates are assembled in this manner to provide a fuel cell stack.

For the electrodes to function effectively in SPE fuel cells, effective electrocatalyst sites must be provided. Effective electrocatalyst sites have several desirable characteristics: (1) the sites are accessible to the reactant, (2) the sites are electrically connected to the gas diffusion layer, and (3) the sites are ionically connected to the fuel cell electrolyte. In order to improve ionic conductivity, ion exchange polymers are often incorporated into the electrodes. In addition, incorporation of ion exchange polymer into the electrodes can also have beneficial effects with liquid feed fuels. For example, in a direct methanol fuel cell, ion exchange polymer in the anode makes it more wettable by the liquid feed stream in order to improve access of the reactant to the electrocatalyst sites.

In electrodes for some fuel cells employing gaseous feed fuels, hydrophobic components such as polytetrafluoroethylene ("PTFE") are typically employed, in part, to render electrodes less wettable and to prevent "flooding". Flooding generally refers to a situation where the pores in an electrode become filled with water formed as a reaction product, such that the flow of the gaseous reactant through the electrode becomes impeded.

Essentially two approaches have been taken to form electrodes for SPE fuel cells. In one, the electrodes are formed on the gas diffusion layers by coating electrocatalyst and dispersed particles of PTFE in a suitable liquid medium onto the gas diffusion layer, e.g., carbon fiber paper. The carbon fiber paper with the electrodes attached and a membrane are then assembled into an MEA by pressing such that the electrodes are in contact with the membrane. In MEA's of this type, it is difficult to establish the desired ionic contact between the electrode and the membrane due to the lack of intimate contact. As a result, the interfacial resistance may be higher than desired. In the other main approach for forming electrodes, electrodes are formed onto the surface of the membrane. A membrane having electrodes so formed is often referred to as a catalyst coated membrane ("CCM"). Employing CCMs can provide improved performance over forming electrodes on the gas diffusion layer but CCMs are typically more difficult to manufacture.

Various manufacturing methods have been developed for manufacturing CCMs. Many of these processes have employed electrocatalyst coating slurries containing the electrocatalyst and the ion exchange polymer and, optionally, other materials such as a PTFE dispersion. The ion exchange polymer in the membrane itself, and in the electrocatalyst coating solution could be employed in either hydrolyzed or unhydrolyzed ion-exchange polymer (sulfonyl fluoride form when perfluorinated sulfonic acid polymer is used), and in the latter case, the polymer must be hydrolyzed during the manufacturing process. Techniques that use unhydrolyzed polymer in the membrane, electrocatalyst composition or both can produce excellent CCMs but are difficult to apply to commercial manufacture because a hydrolysis step and subsequent washing steps are required after application of the electrode. In some techniques, a "decal" is first made by depositing the electrocatalyst coating solution on another substrate, removing the solvent and then transferring and adhering the resulting decal to the membrane. These techniques also can produce good results but mechanical handling and placement of decals on the membrane are difficult to perform in high volume manufacturing operations.

A variety of techniques have been developed for CCM manufacture which apply an electrocatalyst coating solution containing the ion exchange polymer in hydrolyzed form directly to membrane also in hydrolyzed form. However, the known methods again are difficult to employ in high volume manufacturing operations. Known coating techniques such as spraying, painting, patch coating and screen printing are typically slow, can cause loss of valuable catalyst and require the application of relatively thick coatings. Thick coatings contain a large amount of solvent and cause swelling of the membrane that causes it to sag, slump, or droop, resulting in loss of dimensional control of the membrane, handling difficulties during processing, and poor electrode formation. Attempts have been made to overcome such problems for mass production processes. For example, in U.S. Pat. No. 6,074,692, a slurry containing the electrocatalyst in a liquid vehicle such as ethylene or propylene glycol is sprayed on the membrane while the membrane is held in a tractor clamp feed device. This patent teaches pretreating the membrane with the liquid vehicle prior to the spraying operation to decrease the swelling problems. However, processes employing such pretreatment steps are complicated, difficult to control, and require the removal of large amounts of the vehicle in a drying operation. Such drying operations are typically slow and require either disposal or recycling of large quantities of the vehicle to comply with applicable environmental requirements.

Accordingly, a process is needed which is suitable for the high volume production of catalyst coated membranes and which avoids problems associated with prior art processes. Further, a process is needed which is suitable for the direct application of an electrocatalyst coating composition to a membrane in hydrolyzed form which avoids the swelling problems associated with known processes and which does not require complicated pre-treatment or post-treatment process steps.

SUMMARY OF THE INVENTION

In a first aspect, the invention provides a process for manufacturing a catalyst coated membrane comprising:

(a) applying at least one electrocatalyst coating composition to at least a portion of a surface of a dimensionally stable temporary support;

(b) drying the electrocatalyst coating composition on the temporary support to form at least one first electrode on the temporary support;

(c) applying a polymeric solution or dispersion to the at least one first electrode on the temporary support;

(d) drying the polymeric dispersion to form a sandwich comprising a polymer membrane having a first and a second surface, at least one first electrode, and the temporary support; wherein the first surface of the ion exchange membrane is adjacent to the first electrode;

(e) applying at least one electrocatalyst coating composition to at least a portion of the second surface of the polymer membrane;

(f) drying the electrocatalyst coating composition on the polymer membrane to form a sandwich comprising the at least one second electrode, the polymer membrane, the at least one first electrode and the temporary support; and (g) removing the temporary support to form a catalyst coated membrane comprising a polymer membrane sandwiched between the at least one first and second electrodes.

In the first aspect, the polymeric solution or dispersion is selected from the group consisting of a highly fluorinated ionomer, a precursor thereof, a mixture of the highly fluorinated ionomer with a fluorinated polymer, for example, polytetrafluoroethylene (PTFE) fibrils, and a mixture of the precursor of the highly fluorinated ionomer with a fluorinated polymers.

In the first aspect, the invention further comprises the step of chemically treating the precursor of the highly fluorinated ionomer to convert it to its ionomeric form.

In the first aspect the invention also further comprises applying at least one nonelectrocatalytic coating composition to form a nonelectrocatalytic layer over at least part of the same area of the substrate which is covered by an electrode layer.

In the first aspect, the invention also provides a process wherein applying at least one electrocatalyst coating composition is accomplished by flexographic printing.

In a second aspect, the invention provides for the application of the electrocatalyst coating composition and drying steps to be repeated to form multiple electrode layers covering the same part of the surface of the substrate. If desired, the process advantageously provides multiple electrode layers that vary in composition. In addition or alternatively, the application of the electrocatalyst coating composition may advantageously provide an electrode layer with a predetermined nonuniform distribution of electrocatalyst across the electrode layer.

The process in accordance with the invention is extremely well-suited to high volume commercial manufacture of catalyst coated membranes. Flexographic printing provide thin, well-distributed layers of the electrocatalyst composition and avoid problems associated with coating techniques that employ large quantities of solvent. Alternately, pad printing may be used to apply the electrocatalyst coating composition. The process is extremely versatile and can provide electrodes in any of a wide variety of shapes and patterns and, if desired, can have electrocatalyst or other electrode materials that vary in amount or composition across the electrode, through the thickness of the electrode or both.

DETAILED DESCRIPTION OF THE INVENTION

This invention provides a process for manufacturing catalyst coated membranes that employs, for example, flexographic printing technology to apply an electrocatalyst coating composition onto a dimensionally stable, temporary substrate, drying to form a first electrode, followed by application of a membrane forming solution or dispersion, drying to form a polymer membrane, application of a second electrocatalyst coating composition, and drying the same to form a sandwich comprising the temporary substrate, the first electrode, the polymer membrane, and the second electrode. The temporary substrate is then removed to form the catalyst coated membrane. Of particular interest is such a process adapted for preparing catalyst coated membranes for fuel cell applications.

Figure 1:
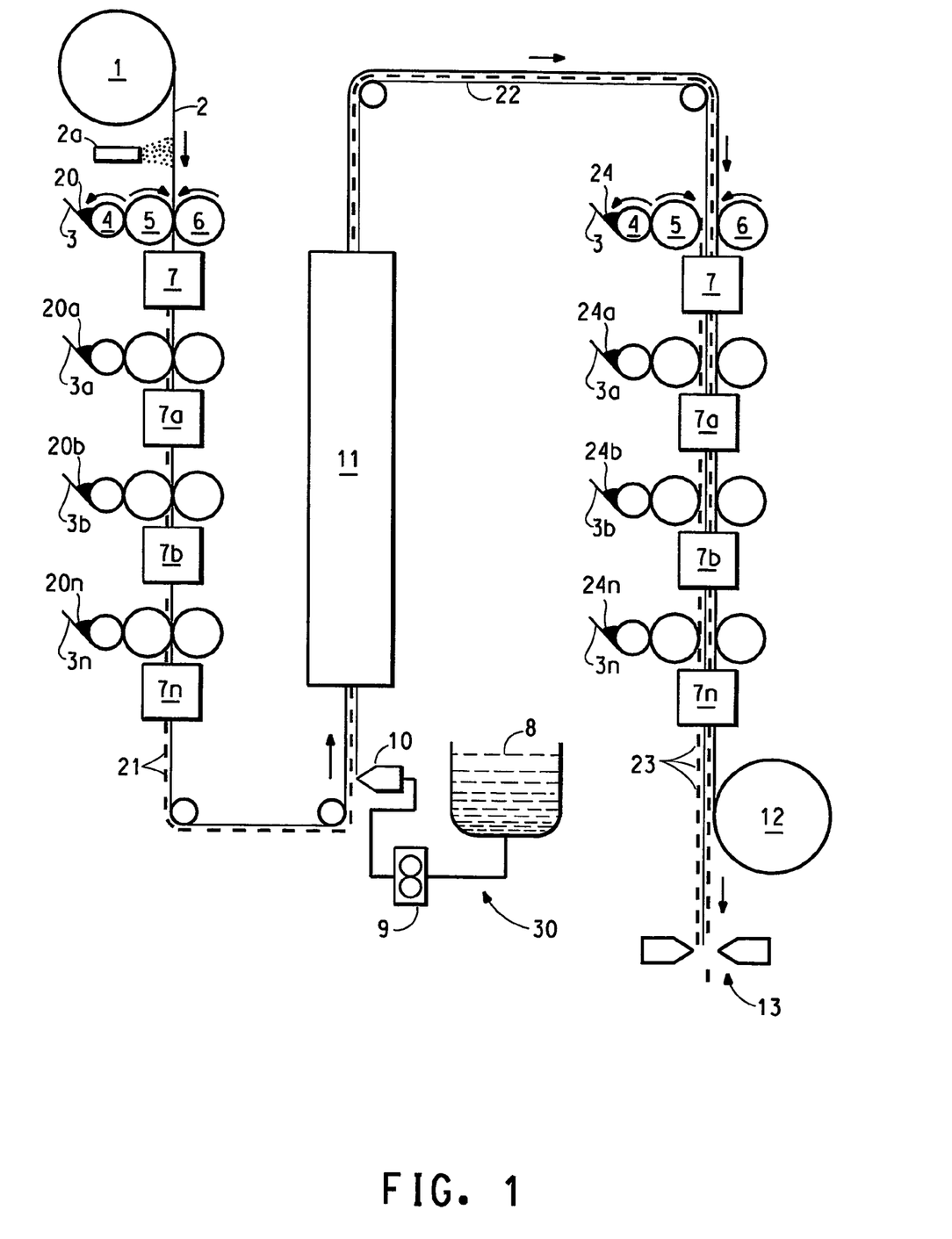
FIG. 1 shows a process in accordance with the invention employing dimensionally stable temporary substrate roll stock utilizing a membrane forming dispersion application section and several discrete flexographic printing stations to form multiple electrode layers in a continuous fashion.

Process For Preparation of CCMs:

As shown in FIGS. 1, a dimesionally stable substrate 2 is unwound from a roll unwind 1 and optionally fed past a treating station 2a, and past at least one printing station 3, typically a flexographic printing station, and drying station 7. Infrared or forced air convection dryers of the type typically used in the printing or film coating industry would be used. Vendors of such equipment include Mark-Andy or Pemarco from basic printing or Black-Clausen or Bachoff & Meyer from film coating. If the dimensionally stable temporary substrate 2 does not have built-in adhesion or release properties, it may be treated with processes, such as corona or electric discharge plasma treatment processes or agents such as primer sprays or sub-coat layers that are either non-functional or can be removed in downstream post-processing. The temporary substrate has to adhere to the sandwich formed on it during the process steps, but needs to be easily separated from the sandwich in step (g) without destroying the sandwich. One example of a treatment for the temporary substrate is an open array of Nafion® straight fluoro-ionomer "dots" printed first on the substrate. Additional printing stations 3a, 3b to 3n and drying stations 7a, 7b to 7n may be present to apply additional electrocatalyst coating composition 20a, 20b, 20n to the temporary substrate 2. The temporary substrate 2 with first electrode 21 formed thereon is led past the membrane forming solution or dispersion coating station 30, wherein the membrane forming dispersion 8, such as a polymeric solution or dispersion, is fed to the application device 10, typically a coating extrusion die or a knife edge applicator, through a precision metering device 9, such as a gear pump, and applied, typically coated or extruded, onto the temporary substrate 2 carrying the first electrode 21. The coated temporary substrate is then fed through a dryer 11 to form the membrane film 22 and the dried coated structure is then fed past at least one additional printing station 3, typically a flexographic printing station, with electrocatalyst coating composition 24, and drying station 7 to form a second electrode 23 on the membrane 22. Additional printing stations 3a, 3b to 3n and drying stations 7a, 7b to 7n may be present to apply additional electrocatalyst coating compositions 24a, 24b, 24n to form a sandwich comprised of the second electrode 23, the membrane 22, the first electrode 21 and the temporary substrate 2. Electrocatalyst coating compositions 20a, 20b, and 20n used to form the first electrode may be the same or different from electrocatalyst coating compositions 24a, 24b, and 24n used to form the second electrode. The temporary support 2 is then removed, typically peeled off the sandwich, leaving a catalyst coated membrane comprised of at least a first electrode 21, a polymer membrane 22 and at least a second electrode 23. This sandwich may then be chopped into discrete sized pieces at chopping station 13 of the type used for high value plastic sheeting such as X-Ray film, ink jet transparency stock etc.

The chopped film may then be provided post treatments such as calendering, vapor treatment to affect water transport, or liquid extraction to remove trace residuals from any of the above earlier manufacturing steps. If the membrane dispersion or solution used was the precursor of the highly fluorinated ionomer, after application of the solution or dispersion the sandwich formed may be subjected to a chemical treatment to convert the precursor to the ionomer.

Flexographic Printing:

Raised relief printing as used herein refers to processes which employ any of a variety of types of pre-formed plates which have raised areas which define the shape or pattern to be printed on a substrate. In use in accordance with the present invention, the raised areas of the plate are contacted by and become coated with a liquid electrocatalyst coating composition and then the raised areas are brought into contact with the membrane to deposit the composition onto the membrane. After drying, the shape or pattern defined by the raised areas is thereby transferred to membrane such as an ion exchange membrane to form an electrode layer. If desired, the relief printing is advantageously employed to form an electrode that is a build-up of multiple electrode layers.

In accordance with a preferred form of the present invention, flexographic printing is the raised relief printing method employed. Flexographic printing is a well known printing technique used widely for packaging applications which employs elastomeric printing plates and is described in the Kirk-Othmer's Encyclopedia of Chemical Technology, 4th edition, 1996, John Wiley and Sons, New York, N.Y., volume 20, pages 62-128, especially pages 101-105. Such plates include sheet photopolymer plates, sheets made from liquid photopolymer and rubber printing plates. Especially useful are flexographic printing techniques that use photopolymer printing plates. The most preferred relief printing technique employs solid-sheet photopolymer plates such as the photopolymer flexographic printing plates sold by E.I. Du Pont de Nemours and Company of Wilmington, Del. under the trademark Cyrel®.

The flexographic method offers considerable benefits in cost, changeover, speed, and ease of printing on thin extensible substrates, such as ion exchange membranes and in the variety of electrodes that can be printed. The printed area may be of virtually any shape or design, regular or irregular, which can be transferred to the plate. Possible shapes include circles, ovals, polygons, and polygon having rounded corners. The shape may also be a pattern and may be intricate if desired. For example, flexography may be used to print an electrode having a shape that coincides with pathway of fuel and oxidant flow fields.

Multiple applications of the same or different coatings to the same area are easily accomplished using flexographic printing. In existing uses of flexography, it is common to apply multiple colors of ink in close registration and these techniques are well-suited to the printing of electrodes having overlying multiple layers. The composition and the amount of coating applied per application may be varied. The amount of coating applied at each pass may be varied across the coated area, i.e., length and/or width. Such variation need not be monotonic or continuous. The precision of flexographic printing has the further advantage of being very economical in the use of coating solution, which is particularly important for expensive electrocatalyst coating compositions.

The process of the invention also typically includes the raised relief printing of a electrocatalyst coating composition onto the opposite surface of a membrane such as an ion exchange membrane to form at least one electrode layer covering at least a part of the opposite surface of the membrane in registration with the electrode layer first applied to the membrane. Again, the ability of flexographic printing to handle multiple applications in close registration is useful for this aspect of the invention.

In the typical flexographic printing method in accordance with the invention using solid-sheet photopolymer flexographic plates, commercially available plates such those sold under the trademark Cyrel® are well adapted for use in the process. Cyrel® plates are thick layers of photopolymer uniformly deposited/bonded to 5 to 8 mil poly(ethylene terephthalate) (PET), then capped with a thin easy-release PET coversheet. The photopolymer itself is a miscible mixture of about 65% acrylic polymer(s), 30% acrylic monomer(s), 5% dyes, initiators, and inhibitors. U.S. Pat. Nos. 4,323,636 and 4,323,637 disclose photopolymer plates of this type.

Negatives having images to create the raised areas on the plate can be designed by any suitable method and the creation of negatives electronically has been found to be especially useful. Upon UV exposure through the negative, monomer polymerization occurs in select areas. Following removal of the PET coversheet, unexposed, non-polymerized material may be removed by a variety of methods. The unexposed areas may be simply washed away by the action of a spray developer. Alternatively, the non-polymerized monomer may be liquefied by heating and then removed with an absorbent wipe material. A compressible photopolymer relief surface, made to photographic resolution is thus created. This relief surface serves to transfer electrocatalyst coating composition from a bulk applicator to a print applicator or to the substrate surface itself. Formation of an electrode layer occurs by simple wetting coupled with mechanical compression of the elastomeric plate.

When rubber printing plates are employed, the pattern may be generated by known techniques including molding said rubber plate in the desired pattern or by laser ablation to yield the desired shape or pattern.

Figure 2:
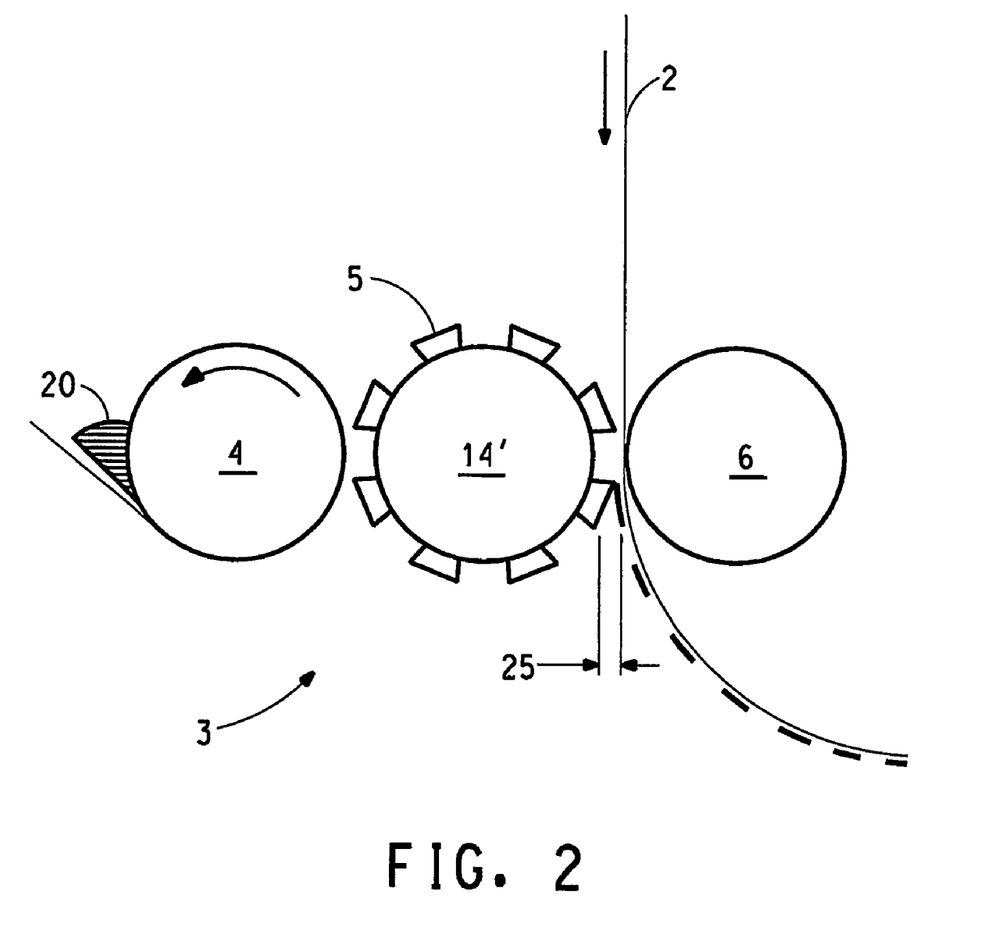
FIG. 2 shows the use of flexographic press equipment to form electrodes on one side of a discrete length of membrane.

FIG. 2 shows the use of flexographic press equipment to form electrodes on one side of a discrete length of membrane in accordance with the present invention. As shown in FIG. 2, in coating station 3, the electrocatalyst coating composition 20 is picked up by the anilox roll 4. An anilox roll is a standardized tool of the printing industry consisting of a precision engraved cellular surfaced roll that draws out a uniform wet ink film from the ink reservoir. GMS anilox rolls have been found to be useful. Alternately, anilox rolls obtained from the Harper Corp. or Dean Printing Supplies or Pemarco Inc. that can apply even heavier coats (100 lpi, 90 lpi, 80 lpi) with some tradeoff in uniformity and physical quality may be used.

The wet ink thickness is controlled by the specific anilox cell geometry chosen. A portion of this ink film is transferred to a relief printing plate 5 having a plate impression 25, such as a Cyrel® flexographic printing plate, positioned on a drum 14'. A membrane 2, such as a perfluorinated sulfonic acid polymer membrane in acid form, which is available under the trademark Nafion® from E.I. DuPont de Nemours and Company, is pressed by a rotating drum 6 against the mounted printing plate 5 and picks up the electrocatalyst coating composition 20 from the relief printing plate 5, to form a relief image on the membrane. The dried relief image serves as an electrode 21 on the temporary substrate 2. This can be repeated the desired number of passes to produce the desired thickness of the electrode.

Temporary Support:

The temporary support may be of any material that has dimensional stability during the processing steps of the invention. The support may have a release surface or be provided with a release surface by treating or coating it with a substance that would assist in removal of the temporary support from the CCM in step (g). Some suitable examples include polyesters including polyethylene terephthalate, polyethylene naphthanate; polyamides, polycarbonates, fluoropolymers, polyacetals, polyolefins, etc. Some examples of polyester films include Mylar® or Melinex® polyester films, E.I. duPont de Nemours and Company, Wilmington, Del. Some temporary supports having high temperature stability include polyimide films such as Kapton®, E.I. duPont de Nemours and Company, Wilmington, Del.

Electrocatalyst Coating Composition:

The process of the present invention employs electrocatalyst coating compositions which are adapted for use in the flexographic printing process. The compositions include an electrocatalyst and an ion exchange polymer in a suitable liquid medium. The ion exchange polymer may perform several functions in the resulting electrode including serving as a binder for the electrocatalyst and improving ionic conductivity to catalyst sites. Optionally, other components are included in the composition, e.g., PTFE in dispersion form.

Electrocatalysts in the composition are selected based on the particular intended application for the CCM. Electrocatalysts suitable for use in the present invention include one or more noble group metals such as platinum, ruthenium, rhodium, and iridium and electroconductive oxides thereof, and electroconductive reduced oxides thereof. The catalyst may be supported or unsupported. For direct methanol fuel cells, a $(Pt-Ru)O_X$ electocatalyst has been found to be useful. Typically used electorcatalyst compositions for hydrogen fuel cells are platinum on carbon, for example, 60 wt % carbon, 40 wt % platinum such as the material with this composition obtainable from E-Tek Corporation Natick, Mass. which, when employed accordance with the procedures described herein, provided particles in the electrode which are less than 1 μm in size, and 60% platinum, 40% carbon obtainable from John Matthey as FC-60.

Since the ion exchange polymer employed in the electrocatalyst coating composition serves not only as binder for the electrocatalyst particles but also assists in securing the electrode to the substrate, e.g. membrane, it is typical for the ion exchange polymers in the composition to be compatible with the ion exchange polymer in the membrane. Most typically, exchange polymers in the composition are the same type as the ion exchange polymer in the membrane.

Ion exchange polymers for use in accordance with the present invention are preferably highly fluorinated ion-exchange polymers. "Highly fluorinated" means that at least 90% of the total number of univalent atoms in the polymer are fluorine atoms. Most preferably, the polymer is perfluorinated. It is also preferred for use in fuel cells for the polymers to have sulfonate ion exchange groups. The term "sulfonate ion exchange groups" is intended to refer to either sulfonic acid groups or salts of sulfonic acid groups, preferably alkali metal or ammonium salts. For applications where the polymer is to be used for proton exchange as in fuel cells, the sulfonic acid form of the polymer is preferred. If the polymer in the electrocatalyst coating composition is not in sulfonic acid form when used, a post treatment acid exchange step will be required to convert the polymer to acid form prior to use.

Preferably, the ion exchange polymer employed comprises a polymer backbone with recurring side chains attached to the backbone with the side chains carrying the ion exchange groups. Possible polymers include homopolymers or copolymers of two or more monomers. Copolymers are typically formed from one monomer which is a non-functional monomer and which provides carbon atoms for the polymer backbone. A second monomer provides both carbon atoms for the polymer backbone and also contributes the side chain carrying the cation exchange group or its precursor, e.g., a sulfonyl halide group such a sulfonyl fluoride ($-SO_2F$), which can be subsequently hydrolyzed to a sulfonate ion exchange group. For example, copolymers of a first fluorinated vinyl monomer together with a second fluorinated vinyl monomer having a sulfonyl fluoride group ($-SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with sulfonate ion exchange groups or precursor groups which can provide the desired side chain in the polymer. The first monomer may also have a side chain which does not interfere with the ion exchange function of the sulfonate ion exchange group. Additional monomers can also be incorporated into these polymers if desired.

Especially preferred polymers for use in the present invention include a highly fluorinated, most preferably perfluorinated, carbon backbone with a side chain represented by the formula —(O—$CF_2CFR_f$)$_a$—O—$CF_2CFR'_fSO_3H$, wherein $R_f$ and $R'_f$ are independently selected from F, Cl or a perfluorinated alkyl group having 1 to 10 carbon atoms, a=0, 1 or 2. The preferred polymers include, for example, polymers disclosed in U.S. Pat. No. 3,282,875 and in U.S. Pat. Nos. 4,358,545 and 4,940,525. One preferred polymer comprises a perfluorocarbon backbone and the side chain is represented by the formula —O—$CF_2CF(CF_3)$—O—$CF_2CF_2SO_3H$. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro (3,6-dioxa-4-methyl-7-octenesulfonyl fluoride) (PDMOF), followed by conversion to sulfonate groups by hydrolysis of the sulfonyl fluoride groups and ion exchanging to convert to the acid, also known as the proton form. One preferred polymer of the type disclosed in U.S. Pat. Nos. 4,358,545 and 4,940,525 has the side chain —O—$CF_2CF_2SO_3H$. This polymer can be made by copolymerization of tetrafluoroethylene (TFE) and the perfluorinated vinyl ether $CF_2$=CF—O—$CF_2CF_2SO_2F$, perfluoro(3-oxa-4-pentenesulfonyl fluoride) (POPF), followed by hydrolysis and acid exchange.

For perfluorinated polymers of the type described above, the ion exchange capacity of a polymer can be expressed in terms of ion exchange ratio ("IXR"). Ion exchange ratio is defined as number of carbon atoms in the polymer backbone in relation to the ion exchange groups. A wide range of IXR values for the polymer are possible. Typically, however, the IXR range for perfluorinated sulfonate polymer is usually about 7 to about 33. For perfluorinated polymers of the type described above, the cation exchange capacity of a polymer is often expressed in terms of equivalent weight (EW). For the purposes of this application, equivalent weight (EW) is defined to be the weight of the polymer in acid form required to neutralize one equivalent of NaOH. In the case of a sulfonate polymer where the polymer comprises a perfluorocarbon backbone and the side chain is —O—$CF_2$—CF($CF_3$)—O—$CF_2$—$CF_2$—$SO_3H$ (or a salt thereof), the equivalent weight range which corresponds to an IXR of about 7 to about 33 is about 700 EW to about 2000 EW. A preferred range for IXR for this polymer is about 8 to about 23 (750 to 1500 EW), most preferably about 9 to about 15 (800 to 1100 EW).

The liquid medium for the catalyst coating composition is one selected to be compatible with the process. It is advantageous for the medium to have a sufficiently low boiling point that rapid drying of electrode layers is possible under the process conditions employed, provided however, that the composition cannot dry so fast that the composition dries on the relief printing plate before transfer to the membrane. When flammable constituents are to be employed, the selection should take into any process risks associated with such materials, especially since they will be in contact with the catalyst in use. The medium should also be sufficiently stable in the presence of the ion exchange polymer that, in the acid form, has strong acidic activity. The liquid medium typically will be polar since it should be compatible with the ion exchange polymer in the catalyst coating composition and be able to "wet" the membrane. While it is possible for water to be used as the liquid medium, it is preferable for the medium to be selected such that the ion exchange polymer in the composition is "coalesced" upon drying and not require post treatment steps such as heating to form a stable electrode layer.

A wide variety of polar organic liquids or mixtures thereof can serve as suitable liquid media for the electrocatalyst coating composition. Water in minor quantity may be present in the medium if it does not interfere with the printing process. Some preferred polar organic liquids have the capability to swell the membrane in large quantity although the amount of liquids the electrocatalyst coating composition applied in accordance with the invention is sufficiently limited that the adverse effects from swelling during the process are minor or undetectable. It is believed that solvents with the capability to swell the ion exchange membrane can provide better contact and more secure application of the electrode to the membrane. A variety of alcohols are well-suited for use as the liquid medium.

Preferred liquid media include suitable C4 to C8 alkyl alcohols including, n-, iso-, sec- and tert-butyl alcohols; the isomeric 5-carbon alcohols, 1, 2- and 3-pentanol, 2-methyl-1-butanol, 3-methyl, 1-butanol, etc., the isomeric 6-carbon alcohols, e.g. 1-, 2-, and 3-hexanol, 2-methyl-1-pentanol, 3-methyl-1-pentanol, 2-methyl-1-pentanol, 3-methyl, 1-pentanol, 4-methyl-1-pentanol, etc., the isomeric C7 alcohols and the isomeric C8 alcohols. Cyclic alcohols are also suitable. Preferred alcohols are n-butanol and n-hexanol. Most preferred is n-hexanol.

The amount of liquid medium in the electrocatalyst composition will vary with the type of medium employed, the constituents of the composition, the type of printing equipment employed, desired electrode thickness, process speeds etc. The amount of liquid employed is highly dependent on viscosity of the electrocatalyst composition that is very important to achieve high quality electrodes with a minimum of waste. When n-butanol is employed as the liquid medium, a coating solids content of from about 9 to about 18% by weight is a particularly useful flexographic printing range. Below about 9% solids, viscosity is undesirably low leading to rapid settling of the catalytic particles, physical leaking from coating applicator "fountain" in standard presses and undesirably low print deposition weights. Furthermore, at levels of n-butanol greater than about 91% by weight, undesirable swelling of perfluorinated sulfonic acid membranes can result. Moreover, above about 18 weight % coating solids, the electrocatalyst coating compositions takes on a paste-like consistency with the associated handling problems, irregular plate wetting, etc. The viscosity of the electrocatalyst coating composition is in the range of about 500 to about 16,000 centipoise, more typically about 2000 to about 8000 centipoise, still more typically 4000 to 8000 centipoise (Brookfield #3 spindle at 6 rpm) for a nominal 18% solids composition as described above with catalyst powders based on carbon supports with about 60 to about 100 m2/gm surface areas and using nominal 5:1 catalyst to fluoroionomer weight ratios.

Handling properties of the electrocatalyst coating composition, e.g. drying performance, can be modified by the inclusion of compatible additives such as ethylene glycol or glycerin up to 25% by weight based on the total weight of liquid medium.

It has been found that the commercially available dispersion of the acid form of the perfluorinated sulfonic acid polymer, sold by E.I. du Pont de Nemours and Company under the trademark Nafion®, in a water/alcohol dispersion, can be used as starting material to prepare an electrocatalyst coating compositions suitable for use in flexographic printing. The method of preparation involves the replacement of the lower alcohols and water in the commercially available dispersion with a C4 to C8 alkyl alcohol through a distillation process. The result is a highly stable dispersion of perfluorinated sulfonic acid polymer in a C4 to C8 alkyl alcohol with a water content less than 2%, more typically less than 0.5%. Solids content can be varied up to 20%.

Using this modified dispersion as base for the electrocatalyst coating composition, the catalytic metal or carbon black supported catalytic metal required to form an electrode can be added which yields a coating composition with excellent printing properties in the process of the present invention.

In the electrocatalyst coating composition, it is preferable to adjust the amounts of electrocatalyst, ion exchange polymer and other components, if present, so that the electrocatalyst is the major component by weight of the resulting electrode. Most preferably, the weight ratio of electrocatalyst to ion exchange polymer in the electrode is about 2:1 to about 10:1.

Utilization of the electrocatalyst coating technique in accordance with the process of the present invention can produce a wide variety of printed layers which can be of essentially any thickness ranging from very thick, e.g., 20 µm or more very thin, e.g., 1 µm or less. This full range of thicknesses can be produced without evidence of cracking, loss of adhesion, or other inhomogenieties. Thick layers, or complicated multi-layer structures, can be achieved by utilizing the very precise pattern registration available using flexographic printing technology to provide multiple layers deposited onto the same area so that the desired ultimate thickness can be obtained. On the other hand, only a few layers or perhaps a single layer can be used to produce very thin electrodes. Typically, 1-2 µm thick layers may be produced with each printing.

The multilayer structures mentioned above permit the electrocatalyst coating to vary in composition, for example the concentration of precious metal catalyst can vary with the distance from the substrate, e.g. membrane, surface. In addition, hydrophilicity can be made to change as a function of coating thickness, e.g., layers with varying ion exchange polymer EW can be employed. Also, protective or abrasion-resistant top layers may be applied in the final layer applications of the electrocatalyst coating.

Composition may also be varied over the length and width of the electrocatalyst coated area by controlling the amount applied as a function of the distance from the center of the application area as well as by changes in coating applied per pass. This control is useful for dealing with the discontinuities that occur at the edges and corners of the fuel cell, where activity goes abruptly to zero. By varying coating composition or plate image characteristics, the transition to zero activity can be made gradual. In addition, in liquid feed fuel cells, concentration variations from the inlet to the outlet ports can be compensated for by varying the electrocatalyst coating across the length and width of the membrane.

Polymeric Solutions or Dispersion:

Polymeric solutions or dispersions, for use in accordance with the invention can be made of the same ion exchange polymers discussed above for use in the electrocatalyst coating compositions. While the polymer may be in alkali metal or ammonium salt form (precursor form) during the application process, it is preferred for the polymer in the membrane to be in acid form to avoid post treatment acid exchange steps. Suitable perfluorinated sulfonic acid polymers in acid form are available under the trademark Nafion® by E.I. du Pont de Nemours and Company.

The polymeric solution or dispersion is selected from the group consisting of a highly fluorinated ionomer, a precursor thereof, a mixture of the highly fluorinated ionomer with a fluorinated polymer, for example, PTFE fibrils, and a mixture of the precursor of the highly fluorinated ionomer with a fluorinated polymers. The expanded PTFE (ePTFE) may be mixed with highly fluorinated ionomer to form the polymeric solution or dispersion. ePTFE is available under the tradename "Goretex®" from W. L. Gore and Associates, Inc., Elkton Md., and under the tradename "Tetratex®" from Tetratec, Feasterville Pa. Impregnation of ePTFE with perfluorinated sulfonic acid polymer is disclosed in U.S. Pat. Nos. 5,547,551 and 6,110,333. Alternately, a fluorinated polymer, eg. PTFE, film may be applied to the surface of the dried membrane coating.

EXAMPLES

Example 1

Preparation of Alcohol Dispersions of Ion Exchange Polymer (Perfluorinated Sulfonic Acid Polymer—Acid Form):

A 3 liter rotary evaporator flask was charged with 1000 g of a perfluorinated sulfonic acid polymer dispersion (Nafion®—obtained from DuPont), comprising 5 weight % 1100 EW perfluorinated sulfonic acid polymer (PDMOF), in 50% water—50% mixed alcohol (methanol, ethanol, 2-propanol media)). Rotary evaporation was commenced at 60 rpm, 15 mm Hg pressure, with the evaporation flask immersed in a 25° C. $H_2O$ bath. A dry ice/acetone bath (−80° C.) was used as the overheads condenser. After several hours of slow, steady operation, 520 gms of $H_2O$/mixed alcohols were removed. As the solids level increased to a nominal 10% level, a noticeable increase in viscosity. (3→20 cps) was observed. A slow approach to this point was necessary to avoid irreversible gelation.

After a 50 gm sample of the evaporation flask residue was removed, 450 g of n-butanol were added to the evaporation flask. The clear liquid turns an opaque, milky white. The roto-vap operation was continued under the same conditions for several more hours until a clear liquid product (436 gms) was obtained. The final measured solids content was 9.51%. The condensed solvent weighed 344 g, indicative of some vapor bypassing the dry ice condenser. A thin butanol layer was observed on the bulk $H_2O$ recovered indicating some butanol vaporization at the chosen conditions.

Repetitions of this basic procedure yield perfluorinated sulfonic acid polymer dispersions in n-butanol with solids contents of up to approximately 13.5% by weight without gelation. Viscosities of the dispersions obtained were typically in the range of 500 to 2000 cps. [should this be higher since flexographic printing is used] (Brookfield/20 to 24° C.). Karl Fisher determinations indicate total residual $H_2O$ content ranging up to 3% in the various dispersions.

In addition to the indicated perfluorinated sulfonic acid polymer dispersion (5% solids, 1100 EW), alternate starting polymer solutions or dispersions may be utilized. For example, some alternate perfluorinated sulfonic acid polymer dispersions include 990 EW perfluorinated sulfonic acid polymer (PDMOF) at 18% solids in 80% mixed alcohol—20% $H_2O$ media produces similar results. Similarly, 1100 EW perfluorinated sulfonic acid polymer (PDMOF) at 50% solids in water and nominal 800 EW perfluorinated sulfonic acid polymer (POPF) at 5% solids in mixed water/alcohol make similar alcohol dispersions using the procedure described above.

In place of n-butanol, other alcohols that were used successfully in the above procedure are n- and iso-amyl alcohol (n- and iso-pentanol), cyclohexanol, n-hexanol, n-heptanol, n-octanol, glycol ethers and ethylene glycol.

Preparation of Electrocatalyst Coatings Compositions:

Using the above containing perfluorinated sulfonic acid polymer/alcohol dispersions as basic component, elecrocatalyst coating compositions suitable for flexographic printing of CCMs for use in fuel cells were prepared as follows:

A 13.2 wt % solids perfluorinated sulfonic acid polymer (1100 EW-PDMOF) in n-butanol dispersion, prepared as described above (28.94 g) was combined with 77.31 g n-butanol. The resulting mixture was then cooled down to ~10° C., well below the 35° C. n-butanol flash point, by the addition of dry ice. This serves to both lower the temperature and to displace the ambient $O_2$ with the generated $CO_2$ gas, thus providing an added margin of safety for the addition of the potentially pyrophoric catalyst powder (platinum supported on carbon). To the cooled mixture, 18.75 g of 60/40 C/Pt (E-Tek Corporation) was added slowly with vigorous stirring in order to wet out the powder instantly and to rapidly dissipate the heat of adsorption. (~5 minutes total). Component amounts are calculated to yield a final solids content of 18.07 wt %. The calculated catalyst content on a dry solids basis was calculated to be 83.07 wt %.

This mixture was then combined with 100 g of zirconia cylinders (0.25 inch×0.25 inch diameter) grinding media in a 250 $cm^3$ mill jar. The jar was sealed and placed on a roll mill table at ~200 rpm at room temperature for 3 to 5 days. After this dispersion method the coating composition was ready for testing and printing operations.

The final coating composition at nominal 18% solids had a stiff "cold cream"—like consistency that measures in the 5,000 to 20,000 cps viscosity range by simple Brookfield methods. Simple gravimetric solids check give results in the 17.8 to 18.3% range. Knife coatings on heavy gauge Mylar® polyester film are useful to further characterize the coating before printing press application. A 5 mil draw knife produces a glossy black wet coating which dries (1 hr/22° C.) to a flat black, fine velvet texture, free from large particles, cracks, craters, repellencies and streaks.

Preparation of CCM's Utilizing Above Electocatalyst Coating Compositions Along with Alcohol Dispersions of Ion Exchange Polymer (Perfluorinated Sulfonic Acid Polymer—Acid Form):

Cyrel® flexographic printing technology (DuPont Company) was used with a similar electrocatalyst coating composition to the above to print directly on a heavy gauge polyester (plain 500A Mylar®). The 18% solids hexanol based composition was altered to provide a 1:1 weight ratio of catalyst to fluoro-ionomer polymer. This change allows the initial 1 or 2 printed layers to serve as a "primer" to provide adequate adhesion for the subsequent layers that follow. We had learned in past that printing the standard 5:1 composition multiple times on Mylar® leads to layer fracture/pick-off owing to inherent weak adhesion and the brittle, friable nature of the porous catalyst structure.

Alternately corona treated Mylar® (DuPont, Wilmington, Del.) may be used to boost the basic adhesion or a sacrificial primer coating that could be H2O washed off (polyvinyl alcohol) as a final stepmay also be used. Another approach may be to print pure Nafion dispersion as a series of "Dots" that provide anchorage points the standard "5:1" catalyst layers to follow. These dots would provide anchorage but also allow critical access of the gases to the porous catalyst layers below.

The 2 impression printing of these primer layers was done using a 300 lines per inch anilox roll that provides ~0.7 to 0.9 μm dry thickness per impression hence a primer dry thickness of ~1.5 μm. This primer structure was allowed to dry at 22° C./40% RH several minutes until a flat black/non-gloss appearance was produced. The shapes printed were 25 $cm^2$ squares totaling 25 in number on a strip of 500A Mylar® polyester film (DuPont, Wilmington, Del.) ~10' long, 6" wide.

These "primer" squares were next printed using a standardized hexanol solvent based, catalyst composition with 5:1 weight ratio of catalyst to fluoro-ionomer polymer at 18% solids. The printing was done with a more coarse, deeper 140 lines per inch anilox roll which provides a heavier 1.5 to 2.0 μm dried thickness per impression owing to the thicker wet layers transferred from anilox roll to printing plate and in turn to primer surface.

A total of 6 standard catalyst impressions were used which gave a total thickness of ~9 μm on top of the 1.5 μm primer layer. A simple forced convection heat gun was used to help dry the full catalyst "squares" on the last 2 or 3 print impressions. The maximum temperature used was ~100 C. For continuous web printing, infrared or forced air convection dryers of the type typically used in the printing or film coating industry would be used. Vendors of such equipment include Mark-Andy or Pemarco from basic printing or Black-Clausen or Bachoff & Meyer from film coating.

No signs of any total layer fracture or press pick-off were seen with this "primer" approach.

A sealing layer of straight Nafion® dispersion or 1:1 catalyst formulation is applied, for example by printing, to seal the top surface of electrode 1 prior to application of the membrane dispersion. The solvent chosen should be very fast drying, e.g. butanol or even propanol with highest practical solids content. This is expected to prevent/minimize the seepage of the subsequent bulk coating of the membrane layer from straight Nafion® dispersion from filling some of the pore structure of electrode 1. This is believed to preserve the effectiveness/pore structure of electrode 1. Flexographic printing is effectively used to apply this sealing layer. The press used is a GMS Print Proof system as made by GMS Co. (Manchester, England).

To utilize this GMS printing device for this particular example, a 500A Mylar® (base, 5 mils thick, approximately 6" wide and 10' long was mounted on the print drum. The Cyrel® flexographic plate PLS was imaged using UV radiation with typical 8 to 10 minute exposure through a photographic contact negative phototool, and the unexposed areas washed away by the appropriate Cyrel® Optisol® developer solution to produce five 25 $cm^2$ (5×5 cm) squares aligned vertically, with each square separated by 2 cm of non-image area. The flexographic plate was mounted on a roll which in rotary motion printed the electrocatalyst coating composition on the moving substrate. After printing the moving plate was re-coated by contacting the newly inked anilox roll.

The plate and print drum geometry was such that 5 separate plate impressions were achieved per single rotation of the print drum holding the membrane. In a single print drum rotation 25 single impressions were made. The relative speed difference between plate and print drum was zero over the cycle eliminating scuffing, scratches etc. The plate/film gap was adjusted to achieve plate/film contact with an additional 2 mils of plate/film compression during the initial press setup. This was provided by adjusting the GMS anilox roll to mounted substrate gaps and alignment.

The anilox cell count selected for the primer mentioned above was 300 lines/inch which in printers terminology gives ~5 billion cubic microns per sq inch. This in turn translated to a nominal 8μ to 9μ wet thickness on the anilox roll. This wet film layer in part transferred to the plate. The plate in turn transferred part of this wet film layer thickness from the plate to the membrane substrate.

After printing, the plate surface was immediately re-coated by immediate rotational contact with the anilox roll specifically chosen for exact coating metering to Cyrel® flexographic plate surfaces. The typical deposition thickness of dried coating composition to the membrane substrate was about 0.7 to 0.9 microns with the 18% solids formulation coating described above. To build increased catalyst layer thickness, with typically 0.7 to 0.9 micron dried increments, with fixed coating/plate conditions, printing was repeated one or more times with approximately +/−0.2 mm registration on the first dried layer to yield additional layer(s).

The additional layers of standard catalyst were added with the 140 anilox roll as mentioned above to reach target platinum goal quickly in the fewest number successive print/dry applications. This was a useful means of balancing potential performance along with physical quality versus incremental catalyst cost. Multiple prints also tend to smooth out any deposition non-uniformity associated with the printing process. Alternately, anilox rolls obtained from the Harper Corp. or Dean Printing Supplies or Pemarco Inc. that can apply even heavier coats (100 Ipi, 90 Ipi, 80 Ipi) with some tradeoff in uniformity and physical quality may be used.

The mis-registration observed for as many as 12 prints/side was on the order of 0.2 mm.

Following the creation of this first electrocatalyst layer on this geometrically, environmentally stable Mylar® support, the coated membrane was removed from the GMS proof press and stretched flat on a table top.

A perfluorinated sulfonic acid polymer membrane was knife cast from a 12% solids dispersion of 990 EW polymer in n-butanol. The knife gap was set to 45 mils and the liquid layer was applied 6" wide over the entire 10' length of first Catalyst/Mylar® film structure. Adjustable coating knives of the width & type used can be obtained from the Gardener Co. The wet coating was protected from airborne dust/dirt by an intermediate screen placed over but out of contact with the wet surface. This sample was placed in a long fume hood and allowed to dry several days at 22C/40% RH conditions. The final membrane dried thickness was measured at 1.8 to 2.0 mils in the non-catalyst areas.

The formed fluoro-ionomer membrane/first Catalyst/Mylar structure was then remounted on the GMS proof printer. The same standard catalyst composition (5:1 catalyst/fluoro-ionomer ratio, 18% solids, n-hexanol solvent) as described above was then printed using the 140 Ipi anilox roll. In the same 25 $cm^2$ pattern in precise registration with electrode 1.

A simple forced convection heat gun was used to help dry the electrode 2 "squares" on the last 2 or 3 print impressions to complete the electrode 2/Fluoro-ionomer membrane/electrode 1 structure completing the CCM example.

With appropriate drying stages in between the above example steps the basis for a continuous in-line method for CCMs, that takes advantage of the inherent dimensional stability of the heavy gauge Mylar® throughout the entire process, is established.

A cut section of this CCM/Mylar® structure was placed in a 22C/100% RH environment for ~1 hour. The CCM itself was easily separated form the Mylar® carrier sheet cleanly with no residues from electrode 1 left on the Mylar® surface.

In this way catalyst coated membranes (CCM) have been reproducibly machine manufactured at high speed with little or no waste. Since all perfluorinated sulfonic acid polymer components were used in the acid form so that there is no need for subsequent hydrolysis steps.

What is claimed is:

1. A process for manufacturing a catalyst coated membrane comprising:
    (a) providing a dimensionally stable temporary support having a surface;
    (b) flexographically printing at least one electrocatalyst coating composition on at least a portion of the surface of the dimensionally stable temporary support;
    (c) drying the electrocatalyst coating composition on the temporary support to form at least one first electrode on the temporary support;
    (d) flexographically printing at least one additional layer of at least one electrocatalyst coating composition on the first electrode and drying said additional layers of electrocatalyst coating composition so as to increase the thickness of the first electrode;
    (e) applying a polymeric solution or dispersion to the at least one first electrode on the temporary support;
    (f) drying the polymeric solution or dispersion to form a polymer membrane having a first and a second surface, wherein the first surface of the polymer membrane is adjacent to the first electrode;
    (g) flexographically printing at least one electrocatalyst coating composition on at least a portion of the second surface of the polymer membrane;
    (h) drying the electrocatalyst coating composition on the second surface of the polymer membrane so as to form at least one second electrode adjacent to the second surface of the polymer membrane so as to yield a catalyst coated membrane comprising a polymer membrane sandwiched between the first and second electrodes;
    (i) flexographically printing at least one additional layer of at least one electrocatalyst coating composition on the second electrode and drying said additional layer of electrocatalyst coating composition so as to increase the thickness of the second electrode; and
    (j) removing the temporary support from the first electrode at a time after the formation of the polymer membrane.

2. The process of claim 1 wherein the polymeric solution or dispersion is selected from the group consisting of a highly fluorinated ionomer, a precursor thereof, a mixture of the highly fluorinated ionomer with a fluorinated polymer, and a mixture of the precursor of the highly fluorinated ionomer with a fluorinated polymer.

3. The process of claim 2 wherein the fluorinated polymer is a PTFE fibril.

4. The process of claim 2 wherein the polymeric solution or dispersion comprises a precursor of a highly fluorinated ionomer, and further comprising the step of chemically treating the precursor of the highly fluorinated ionomer to convert it to its ionomeric form.

5. The process of claim 2 wherein the electrocatalyst coating composition printed on the temporary support and the electrocatalyst coating composition printed on the second surface of the membrane each comprises an electrocatalyst, an ion exchange polymer and a liquid medium.

6. The process of claim 2 wherein the highly fluorinated ionomer comprises a perfluorinated ion exchange polymer.

7. The process of claim 1 wherein the printing of the electrocatalyst coating composition and drying steps are repeated to form multiple electrode layers that vary in composition among said multiple layers.

8. The process of claim 1 wherein the printing of the electrocatalyst coating composition and drying steps provide an electrode with a predetermined nonuniform distribution of electrocatalyst across the electrode layer.

9. The process of claim 1 wherein the first electrode and second electrode each have exterior surfaces facing away from the membrane, and further comprising applying at least one nonelectrocatalytic coating composition to at least one of said exterior electrode surfaces to form a nonelectrocatalytic layer over at least part of the same area of the membrane that is covered by an electrode layer.

10. The process of claim 9 wherein said nonelectrocatalytic layer is an abrasion-resistant coating covering said at least one exterior electrode surface.

11. The process of claim 9 wherein said nonelectrocatalytic layer is a sealant covering said at least one exterior electrode surface.

12. The process of claim 1 wherein electrocatalyst coating composition printed onto the second surface of the membrane to form to second electrode is in registration with the first electrode on the first surface of the membrane.

13. The process of claim 12 wherein the catalyst coating composition printed on the temporary support is different from the catalyst coating composition printed on the second surface of the membrane.

14. The process of claim 1 wherein the electrocatalyst coating composition printed on the temporary support and the electrocatalyst coating composition printed on the second surface of the membrane each has a viscosity of about 500 to about 16,000 centipoise.

15. The process of claim 14 wherein the electrocatalyst coating composition printed on the temporary support and the electrocatalyst coating composition printed on the second surface of the membrane each has a viscosity of about 2000 to about 8000 centipoise.

16. The process of claim 1 wherein drying of the electrocatalyst coating composition on the temporary support is conducted at ambient temperatures.

17. The process of claim 1 wherein the temporary support is a substrate comprising polymer selected from the group consisting of polyesters; polyamides, polycarbonates, fluoropolymers, polyacetals, polyolefins, and polyimides.

18. The process of claim 17 wherein the temporary support is a polyester film.

19. A process for continuously manufacturing catalyst coated membrane comprising:
   (a) providing a roll of a dimensionally stable temporary support having a surface;
   (b) unrolling the dimensionally stable temporary support from the roll;
   (c) passing the dimensionally stable support unrolled from the roll through a first flexographic printing station where a first electrocatalyst coating composition is flexographically printed on the surface of the temporary support;
   (d) drying the first electrocatalyst coating composition on the temporary support to form a first electrode on the temporary support;
   (e) passing the dimensionally stable support with said first electrode through an application device where a polymeric solution or dispersion is applied on the first electrode on the temporary support;
   (f) drying the polymeric solution or dispersion to form a polymer membrane having a first and a second surface, wherein the first surface of the polymer membrane is adjacent to the first electrode;
   (g) passing the dimensionally stable support with said first electrode and said polymer membrane through a second flexographic printing station where a second electrocatalyst coating composition is flexographically printed on the second surface of the polymer membrane;
   (h) drying the second electrocatalyst coating composition on the second surface of the polymer membrane so as to form a second electrode adjacent to the second surface of the polymer membrane so as to yield a catalyst coated membrane comprising a polymer membrane sandwiched between the first and second electrodes; and
   (i) collecting said catalyst coated membrane.

20. The process of claim 19, wherein the step of collecting said catalyst coated membrane includes the step of cutting into sections the dimensionally stable support having a catalyst coated membrane comprising a polymer membrane sandwiched between the first and second electrodes adhered thereto, and collecting said sections.

* * * * *

UNITED STATES PATENT AND TRADEMARK OFFICE
CERTIFICATE OF CORRECTION

PATENT NO. : 7,316,794 B2 Page 1 of 1
APPLICATION NO. : 10/490068
DATED : January 8, 2008
INVENTOR(S) : William George O'Brien It is certified that error appears in the above-identified patent and that said Letters Patent is hereby corrected as shown below:

Column 16, line 14; "layers" should read --layer--
Column 17, line 18; "form to" should read --form the--

Signed and Sealed this

Twenty-seventh Day of May, 2008

JON W. DUDAS
*Director of the United States Patent and Trademark Office*